UNITED STATES PATENT OFFICE.

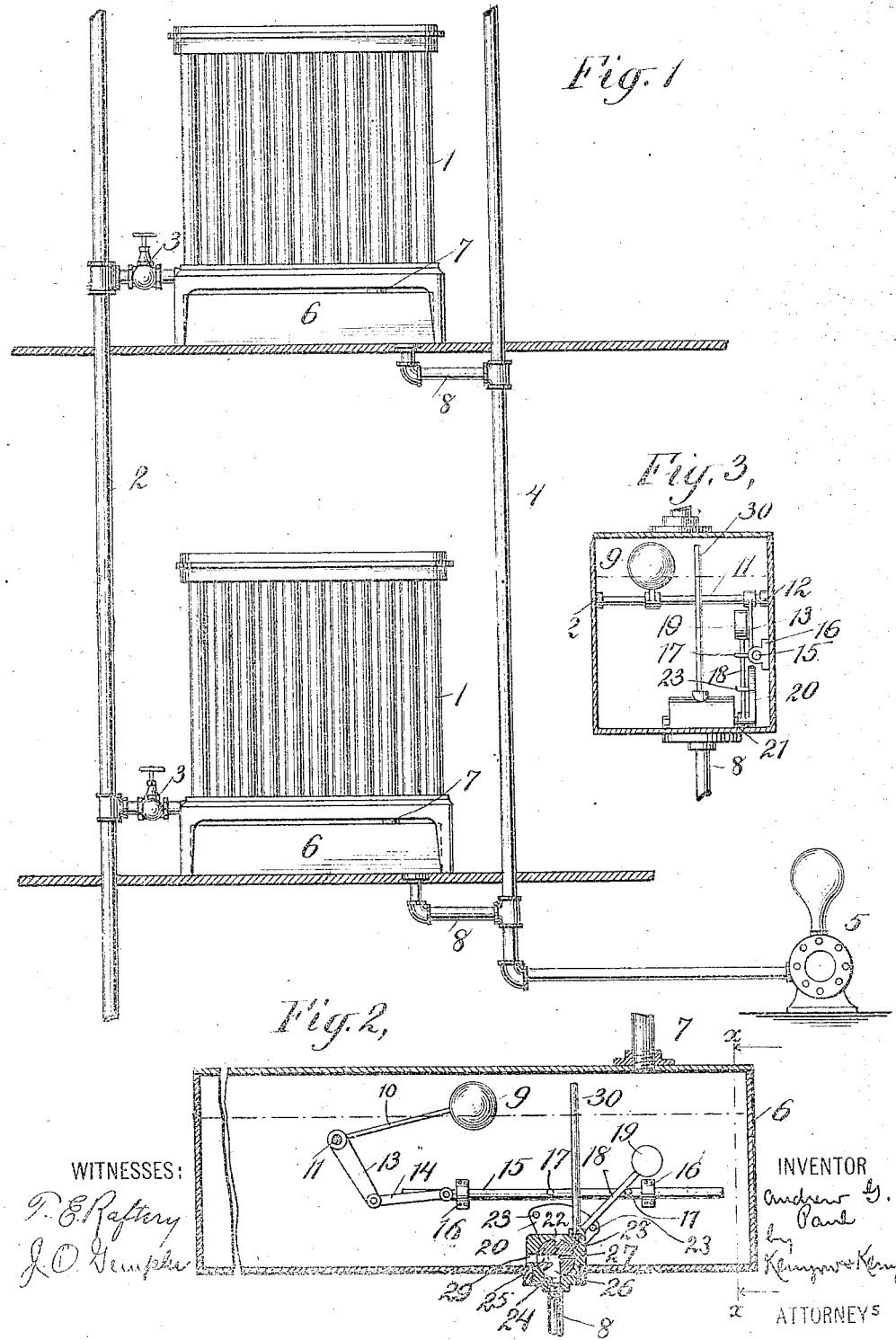

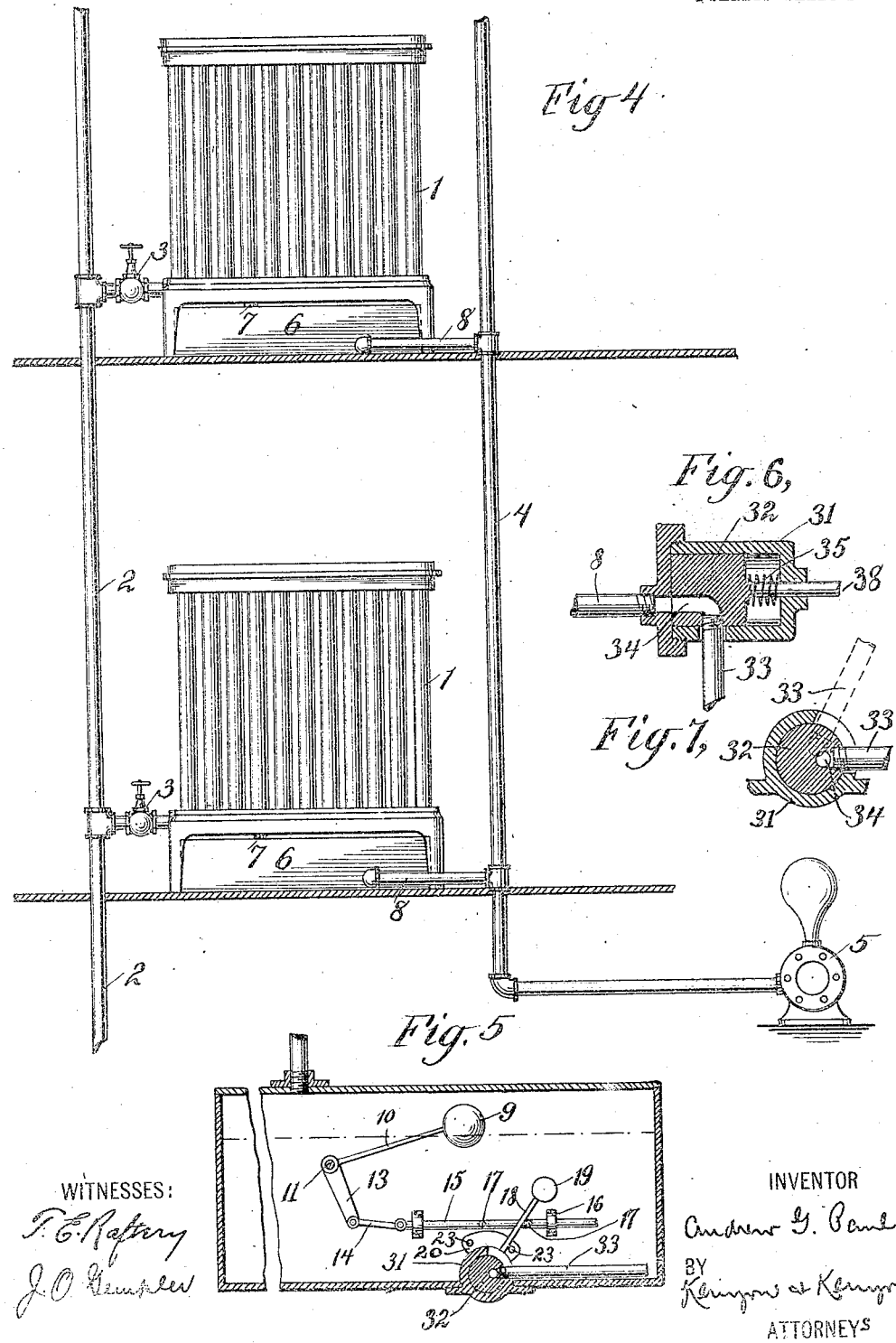

ANDREW G. PAUL, OF BOSTON, MASSACHUSETTS, ASSIGNOR TO PAKIN COMPANY, A CORPORATION OF NEW YORK.

STEAM-TRAP FOR USE IN HEATING SYSTEMS.

No. 863,212.

Specification of Letters Patent.

Patented Aug. 13, 1907.

Application filed April 16, 1901. Serial No. 56,057.

*To all whom it may concern:*

Be it known that I, ANDREW G. PAUL, a citizen of the United States, residing in Boston, in the county of Suffolk and State of Massachusetts, have invented a new and useful Improvement in Steam-Traps for Use in Heating Systems, of which the following is a full, clear, and exact specification, reference being had to the accompanying drawings which form a part hereof.

This invention relates to a steam trap for use in a heating system wherein steam or other suitable heating agent is circulated for the purpose of conveying and imparting heat to the places desired, and it consists in an improved construction and arrangement of the parts of such a steam trap.

The object of my invention is to provide means whereby the air and gases and the water of condensation can be automatically and completely removed from the system, whereby the circulation of the heating vehicle in the system will be rendered more positive and efficient and the heating work done by the system will be improved without substantial loss of the heating vehicle.

My invention consists in a steam trap having a discharge valve adapted when in one position to discharge air or vapor, and when in the opposite position to discharge water, a float device, and means connecting the float and the valve adapted to give the valve a quick throw near the end of the travel of the float.

My invention also consists in a steam trap having a passage for the discharge of the water of condensation, a passage for the discharge of air or vapor, a discharge valve provided with two passages, one for air and one for water adapted to register alternately with the main air and water passages, and a float device to operate the valve.

My invention also consists in certain other features of construction and combinations of parts hereinafter described and claimed.

My invention is fully illustrated in the accompanying drawings in which

Figure 1 shows my invention applied to a system having two radiators with a tank in the base of each radiator; Fig. 2 is a vertical sectional view of the tank at the base of each radiator showing the float device and its connection with the discharge valve; Fig. 3 is a vertical cross-sectional view on the line x—x of Fig. 2 looking from right to left; Fig. 4 shows a modification of my invention; Fig. 5 is a vertical sectional view of the tank at the base of the radiator in Fig. 4 showing the form of valve used in this modification; Fig. 6 is a horizontal section of the discharge valve when in the position shown in Fig. 5; Fig. 7 is a vertical section of the discharge valve, showing in dotted lines the position of the parts when air is being discharged.

Similar numbers refer to similar parts in the different figures.

Referring to Figs. 1 and 2, 1, 1 are radiators of any suitable form. 2 is a supply pipe having branches leading to the radiators, these branches being provided with any suitable form of supply valves 3, 3. 4 is the discharge pipe and 5 is an exhausting device of suitable form connected with the lower end of the discharge pipe. Each radiator is provided at its base with a tank or reservoir 6 which in the particular form of apparatus shown is connected with the radiator by means of the pipe 7. This tank could, however, be formed by the lower part of the radiator itself if preferred. 8, 8 are branch pipes leading from the tanks 6 to the common discharge pipe 4. 9 is a float device adapted to be operated by the water of condensation that collects in the tank 6. This float is connected by means of the arm 10 with the rock shaft 11 which is adapted to turn in suitable bearings 12 attached to the sides of the tank as shown in Fig. 3. 13 is a rocking lever fastened to the rock shaft 11 and connected by means of the link 14 with the sliding rod 15. The rod 15 is adapted to slide in bearings 16 which are attached to the side of the tank as shown. 17, 17 are pins projecting from the sliding rod 15 and adapted to move the rocking lever 18 which carries the weight 19 at its upper end. 20 is a plate which is fastened to the valve stem 21 carrying the valve plug 22. The plate 20 is provided with the pins 23 which project into the path of the rocking lever 18 so that as the lever 18 is rocked on the valve stem it strikes the pins 23 and rocks the plate 20 and thereby turns the plug 22 of the valve. The lever 18 is mounted so as to turn loosely on the valve stem 21 so that the valve plug is not turned until the lever 18 strikes one of the pins 23 on the plate 20. 24 is the discharge valve. This valve is made in the form of a three-way valve, that is to say, the valve plug 22 is provided with three passages 25, 26 and 27 as shown. The casing of the valve is provided with a small passage 28 for the escape of the air or gas or vapor, and with a larger passage 29 for the discharge of the water of condensation. 30 is a pipe connected with the passage 28 in the valve casing and opening near the top of the tank 6. The passages 27 and 28 are preferably made of small diameter and adapted to register with each other when the discharge valve is thrown into position to discharge the air or gas or vapor. The passages 25, 26 and 29 are made of larger diameter and the passages 25 and 29 are adapted to register with each other, and the passage 26 is adapted to register with the discharge pipe 8 when the discharge valve is thrown into a position to permit the discharge of the water of condensation.

The operation of this form of my invention is as follows. Assuming that the float 9 is in the position shown in Fig. 2 with the tank 6 nearly full of the water of condensation, if the exhausting device 5 is started the water of condensation will be drawn out from the tank 6, the discharge valve 24 being in the position shown in Fig. 2. As the water is discharged the float 9 falls and by means of the connections already described moves the rod 15 towards the left as shown in Fig. 2. The pin 17 at the right, moves the rocking lever 18 until the weight 19 crosses or passes beyond the center line of its travel, when the weight 19 causes the rocking lever 18 to fall, moving the rod 15 to the left and also striking the pin 23 on the plate 20 with a hammer blow and causing the plug 22 of the discharge valve to be turned positively and completely so as to bring the passage 27 in line with the passage 28. By this turning of the valve plug the passage 25 is cut off from the passage 29. The passage 26, however, still registers with the discharge pipe 8. The valve is therefore in condition for the discharge of the air or vapor and the exhausting device operates to cause the discharge of said air or vapor from the tank 6. The water of condensation gradually accumulates in the tank 6, lifting the float 9. As the float rises it reverses the motion of the sliding rod 15 and gradually moves the rocking lever from left to right until the weight 19 again passes the center line of its throw when it causes the rocking lever 18 to fall to the right, moving the rod 15 into the position shown in Fig. 2 and at the same time striking a hammer blow against the right hand pin 23 and moving the plate 20 and the valve plug back to the position shown in Fig. 2. The water of condensation is then discharged again through the discharge pipe in the manner already explained. It will be seen that by this construction the passage through the valve for the discharge of the water of condensation remains fully open while the water is being discharged and until the water has fallen to such a point that the position of the valve is reversed in the way already described. After the valve plug has been turned so as to connect the air passage with the discharge pipe, the valve remains in this position until the water has accumulated sufficiently in the tank 6 to again turn the valve in the manner already described. The water of condensation and the air or vapor or gas escape from the radiator into the tank 6 through the pipe 7. The water of condensation and the air or gases are thus intermittently and positively discharged from the system. The air passages 27 and 28 are preferably made of such a size as to prevent the waste of any substantial quantity of the heating vehicle.

Referring to Figs. 4, 5, 6 and 7, the parts are as already described with the following differences. In this modified form of my invention the casing and plug of the discharge valve 24 are constructed in a somewhat different manner. 31 is the casing of the discharge valve. 32 is the plug of the discharge valve which in this case is preferably made in the form of a disk or cylinder. The plug 32 carries the pipe 33 which is securely fastened to the plug of the valve and rocks with it. 34 is a passage through the plug which registers at the inlet end with the pipe 33 and which at the outlet end is so placed as to be eccentric with relation to the plug 32. When the plug is turned into the position shown in Fig. 5 so that the pipe 33 is in its lowest position, the outlet end of the passage 34 coincides with or registers with the discharge pipe 8. When the plug is turned into the other position so that the pipe 33 is raised as shown in dotted lines in Fig. 7, the outlet end of the passage 34 has been so changed in position with reference to the end of the discharge pipe 8 that the opening between the two is materially decreased as clearly illustrated in Fig. 7. The arrangement of the parts can be varied so as to make this opening more or less. The plug 32 is held against its seat by means of the spring 35 encircling the rod 38 or by any other suitable means.

The operation of this form of my invention is as follows. When the water of condensation has risen in the tank 6 to the predetermined level, the discharge valve is thrown into the position shown in Fig. 5 with the pipe 33 in a substantially horizontal position and with the passage 34 through the plug coinciding with the end of the discharge pipe 8 so as to give a full, free opening for the discharge of the water of condensation. The water is discharged through the pipe 33, passage 34, pipe 8, and this discharge is aided by the operation of the exhausting device. When the water has fallen sufficiently in the tank the plug 32 is turned by the devices already fully explained so as to be in the position indicated in dotted lines in Fig. 7. In this position the larger end of the pipe 33 opens into the upper part of the tank and the air and gas are discharged from the tank through the pipe 33, the passage 34, the decreased opening between the passage 34 and the pipe 8, and the pipe 8. In this way the water of condensation and the gas and vapor are positively and intermittently discharged from the system. The parts can be so adjusted with relation to one another that the opening between the passage 34 and the pipe 8 can be made of any desired size or dimension when the valve is in position for the discharge of air or vapor, as a result of which the waste of any substantial quantity of the heating vehicle can be prevented.

It is obvious that my improved heating system can be used for drying purposes.

Some of the advantages of my invention are as follows. The air and gas and the water of condensation are discharged from the system with certainty and with positiveness. The float device controls and operates the discharge valve and its connected parts reliably and positively. The parts can be so arranged as to vary the intervals between the discharge of the water and the air or gas according to the conditions or requirements of the system and according to what is deemed to be the best and most economical method of operating the same. My improvement can also be employed with advantage in a system in which no exhausting device is used to permit the discharge of the water and air.

What I claim as new and desire to secure by Letters Patent, is:

1. A steam trap comprising a discharge valve adapted, when in one position, to discharge air or vapor, and, when in the opposite position, to discharge water, a float, and means connecting the float and the valve adapted to give the valve a quick throw near the end of the travel of the float.

2. A steam trap comprising a valve casing provided with independent inlet passageways, one for air or vapor and the other for water of condensation, an air inlet pipe in communication with said air inlet passageway, a discharge valve provided with two passages, one for air and one for water adapted to register alternately with the main air and water passages, whereby the discharge of air and water will be alternately accomplished and prevented, and a float device adapted to operate the valve, substantially as set forth.

3. A steam trap comprising a passage for the discharge of the water of condensation, a passage for the discharge of air or vapor, a discharge valve provided with two passages, one for air and one for water adapted to register alternately with the main air and water passages and a float device adapted to operate the valve, and means connecting the float and the valve and adapted to move the valve at or near the end of the travel of the float, substantially as set forth.

4. A steam trap comprising a discharge valve adapted, when in one position, to discharge air or vapor, and, when in the opposite position, to discharge water, a float, means connecting the float and the valve, one part of said means adapted to slide for a certain distance upon another part whereby the valve is given a quick throw near the end of the travel of the float substantially as described.

5. A steam trap comprising a valve casing, said valve casing being provided with a fixed main inlet passage for the discharge of water of condensation and an independent main inlet passage for the discharge of air or vapor, an oscillating discharge valve provided with two passages one for the air and one for water adapted to register alternately with the main inlet air and water passages whereby the discharge of air and water will be alternately accomplished and prevented and a float device adapted to operate the valve, substantially as set forth.

In testimony whereof, I have signed my name to this specification, in the presence of two subscribing witnesses.

ANDREW G. PAUL.

Witnesses:
EDWIN SEGER,
JOHN O. GEMPLER.